United States Patent [19]
Lu

[11] Patent Number: 5,572,420
[45] Date of Patent: Nov. 5, 1996

[54] METHOD OF OPTIMAL CONTROLLER DESIGN FOR MULTIVARIABLE PREDICTIVE CONTROL UTILIZING RANGE CONTROL

[75] Inventor: Zhuxin J. Lu, Glendale, Ariz.

[73] Assignee: Honeywell Inc., Minneapolis, Minn.

[21] Appl. No.: 415,881

[22] Filed: Apr. 3, 1995

[51] Int. Cl.$^6$ .................................................. G05B 13/04
[52] U.S. Cl. ......................... 364/153; 364/149; 364/165; 364/157
[58] Field of Search ........................... 364/148, 149–151, 364/152–156, 157, 164, 165, 176; 318/561

[56] References Cited

U.S. PATENT DOCUMENTS

| | | | |
|---|---|---|---|
| 5,351,184 | 9/1994 | Lu et al. | 364/157 X |
| 5,442,544 | 8/1995 | Jelinek | 364/149 X |
| 5,457,625 | 10/1995 | Lim et al. | 364/149 X |

*Primary Examiner*—Joseph Ruggiero
*Attorney, Agent, or Firm*—Arthur A. Sapelli; John G. Shudy

[57] ABSTRACT

A process control system which includes at least one manipulated variable and at least one controlled variable, provides a method for robust control of a process. Predetermined constraints of the manipulated variables and the controlled variables, and the present values of the manipulated variables are obtained. The controller is loaded with parameters which define an optimal controller, the parameters being calculated off-line. To determine the parameters a single min-max statement is defined for a worst case model of the process which operates in conjunction with a best case controller. The single min-max statement is converted to a corresponding canonical expression in the form of a minimization problem, the resultant solution of the minimization problem being the parameter. New values are calculated for the controlled variables for a predetermined number of points in the future, such that the values of the controlled variables are within the predetermined range thereby obtaining an optimal robustness of the resultant controller. The manipulated variables are also calculated to be within predetermined constraints, and the controlled variables to fall within a predetermined range when controllable. From a plurality of solutions, a most robust solution is selected. Then the manipulated variables are adjusted to cause the process control system to drive the values of the controlled variables to the calculated values.

1 Claim, 4 Drawing Sheets

METHOD OF OPTIMAL CONTROLLER
DESIGN FOR MULTIVARIABLE
PREDICTIVE CONTROL UTILIZING RANGE
CONTROL

BACKGROUND OF THE INVENTION

The present invention relates to control systems, and more particularly, to a method of designing an optimal controller for robust multivariable predictive control (RMPC) techniques utilizing range controls.

In present day process control systems, many techniques are presently in use which utilize model predictive control techniques which control process variables to predetermined setpoints. Oftentimes the setpoints are a best estimate by the system operator of the value of the setpoint or setpoints. When a process is being controlled to a setpoint, the controller may not be able to achieve the best control performances, especially under process/model mismatch. In order to further enhance the overall performance of the control system, it is desired to design a controller which deals explicitly with plant or model uncertainty.

In the present invention there is provided a method of designing a controller of a process control system of multivariable predictive control utilizing range control. The controller is designed to operate a process, the process being worst case. Thus an optimal controller for the process is achieved, and in the event the actual process is not a worst case process, the controller performance is better than anticipated.

SUMMARY OF THE INVENTION

Therefore, there is provided by the present invention, a method of designing an optimal controller for robust multivariable predictive control (RMPC) techniques utilizing range control. A process control system which includes at least one manipulated variable and at least one controlled variable, provides a method for robust control of a process. Predetermined constraints of the manipulated variables and the controlled variables, and the present values of the manipulated variables are obtained. The controller is loaded with parameters which define an optimal controller, the parameters being calculated off-line. To determine the parameters a single min-max statement is defined for a worst case model of the process which operates in conjunction with a best case controller. The single min-max statement is converted to a corresponding canonical expression in the form of a minimization problem, the resultant solution of the minimization problem being the parameter. New values are calculated for the controlled variables for a predetermined number of points in the future, such that the values of the controlled variables are within the predetermined range thereby obtaining an optimal robustness of the resultant controller. The manipulated variables are also calculated to be within predetermined constraints, and the controlled variables to fall within a predetermined range when controllable. From a plurality of solutions, a most robust solution is selected. Then the manipulated variables are adjusted to cause the process control system to drive the values of the controlled variables to the calculated values.

Accordingly, it is an object of the present invention to provide a method of determining a best controller to achieve optimal control performance on a worst case process system.

This and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 3, which comprises

DETAILED DESCRIPTION

In a robust multivariable predictive controller (RMPC) utilizing range control of the present invention, there is achieved an optimal controller design in an off-line mode which provides the optimal controller to provide best control performance on a worst case process. A detailed description of the RMPC utilizing range control can be had by reference to U.S. Pat. No. 5,351,184, assigned to the same assignee as the present application, and is incorporated by reference herein to the extent necessary for an understanding of the present invention.

Figure 1:
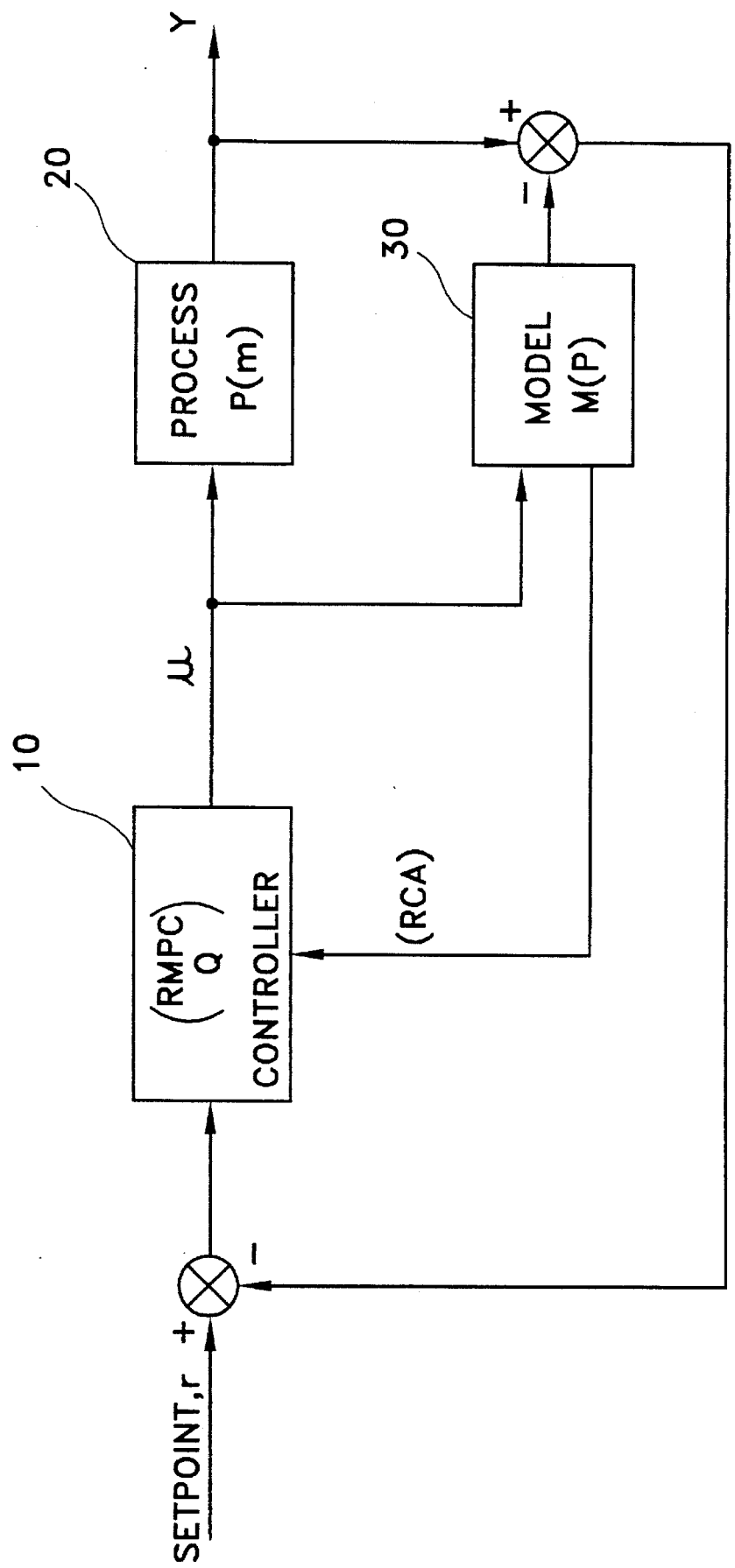
FIG. 1 shows a functional block diagram of a process control system in which the present invention may be utilized.

Referring to FIG. 1, there is shown a functional block diagram of a process control system in which the present invention may be utilized. A controller 10 has multiple outputs, which are coupled as input variables u to a process 20. The process 20 can include, for example, a plurality of elements which can be controlled such as valves, heaters, . . . Process variables y of process 20 include temperature, pressure, level, flow, . . . which govern product quality. The input variables (or manipulated variables) u, are defined as:

$$u = \begin{bmatrix} u_1 \\ u_2 \\ \cdot \\ \cdot \\ \cdot \\ u_k \end{bmatrix}$$

and the output variables (or controlled variables) cv, are defined as:

$$cv = \begin{bmatrix} cv_1 \\ cv_2 \\ \cdot \\ \cdot \\ \cdot \\ cv_n \end{bmatrix}$$

Thus, the process 20 is a dynamic process P(m), having k manipulated variables and n controlled variables. The controlled variables (cv) include $n_1$ regulated cv, $n_2$ restrained cv, and $n_3$ optimized cv. The range control function of controller 10 is formulated to handle the three cases identified above and is fully described in U.S. Pat. No. 5,351,184, identified above.

It is an object of a robust control design of the present invention to deal explicitly with plant or model uncertainty. In general terms, it is desired that the controller maintain a predetermined level of performance even as the process changes. The robust control design insures both robust stability and robust performance. The former insures that the controller is stable for all plants in the set characterized by the uncertainty, while the later insures that reasonable performance can be expected for the same set of plants. The optimal robust control design problem in general form is:

$$\min_{Q} \max_{m} J(Q(p), m)$$

which states the problem is to find a controller Q that minimizes the worst performance J over all parameters m. The performance d is invariably a complex function involving the controller Q 10, the process P 20, and the model M 30. Stability and performance issues further constrain the design. To insure robust stability, model uncertainty constrains the maximum singular value of the complementary sensitivity function. The robust performance requirement constrains the design through the structured singular value.

In the conventional context, robust control design seeks to solve the min-max problem directly for the controller Q 10. Since constraint handling is the most important aspect of virtually all industrial process controllers, conventional robust design is not directly applicable. There are, however, two critical robust control concepts that are instrumental in formulating the RMPC design. The first is the use of the maximum singular value to establish norm bounds on the RMPC controller which is fully described in the patent identified above. The second is the use of the min-max principle for controller synthesis and is discussed below.

The process P (m) 20 is parameterized, e.g., gain, time constant, time delay (or deal time), which are unknown but defined such that a parameter m is between a high and low bound.

$$\underline{m} \leq m \leq \overline{m}$$

The model M 30 is a "description" of the process P 20, however, there is often some degree of mismatch between the model 30 and the process 20. Given a model the RMPC controller can be determined (as described by a range control algorithm [RCA] in the aforementioned patent). Because of the mismatch between the model and the process, different variables are used. Hence, the process P is defined in terms of m, and the model M is defined in terms of p. To further improve the controller stated in general form:

$$\min_{Q(p)} \max_{m} J[Q(p), m]$$

where m are parameters of the process (nothing can be done about the parameters m of the process) and p are parameters of the model.

The problem to be solved by the present invention is:
first) find the worst plant (process)—by maximizing the error space d it doesn't matter which controller is used. There is a parameter combination of m within the high-low bound ($\underline{m} \leq m \leq \overline{m}$) such that process will cause the most trouble.
second) find the best controller which will work with the worst process.

This qualitatively describes the problem to be solved. This is not a maximization problem. This is not a minimization problem. IT IS a MIN-MAX PROBLEM. Min-max is a single operator.

The form of the operator is:

$$\left( \min_{p} \max_{m} \right)$$

Note: minimize p rather than Q(p) since Q is a dependent variable. Once p is selected, Q is known utilizing the RCA.

The general form of the problem to be solved becomes:

$$\min_{p} \max_{m} J[Q(p), m]$$

$$\text{subject to: } \begin{array}{l} \underline{m} \leq m \leq \overline{m} \\ \underline{p} \leq p \leq \overline{p} \end{array}$$

m is discretized within the range such that:

$$m \in [m_1, m_2, m_3, \ldots m_n]$$

and the general form becomes:

$$\min_{p} \max_{i} J_i [Q(p)]$$

where $J_i = J[Q(p), m_i]$.

The above min-max problem is restated in a canonical form by adding a variable α, and is expressed as:

$$\min \alpha$$

$$p, \alpha$$

subject to:

$$J_i(Q(p)) - \alpha \leq 0$$

Figure 2:
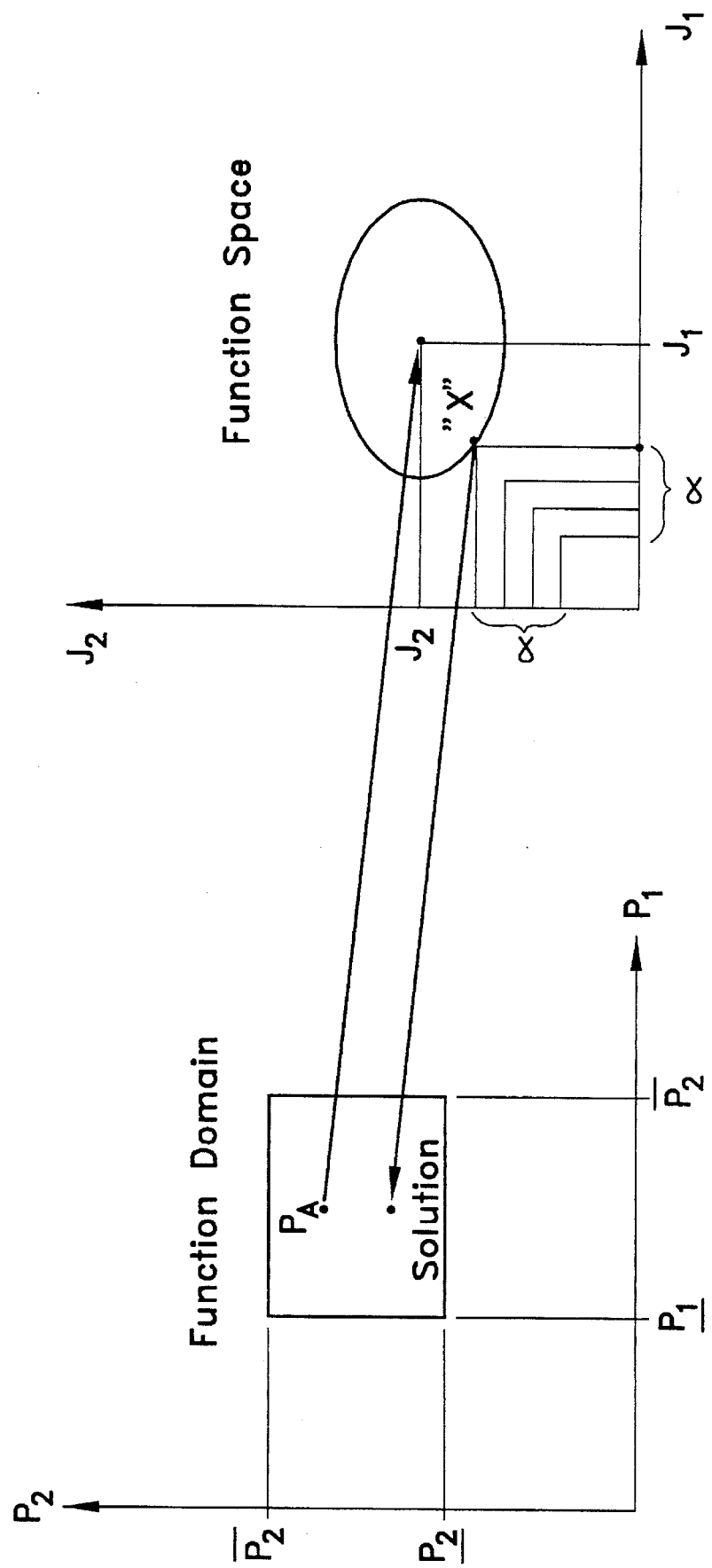
FIG. 2 shows a graphical interpretation for a solution to a two-dimension min-max problem of the present invention.

The canonical form can be shown to be equivalent by graphical interpretation. The canonical form is much easier to solve, since this is a minimization problem. Referring to FIG. 2, there is shown a graphical interpretation for a solution to a two-dimensional rain-max problem (but is equally applicable for 3-dimension, . . . ). Any point $p_A$ drawn in the function domain can be mapped in a function space. $J_i$ is a function of p, and $m_1$, resolves into $J_1$ and $m_2$ resolves into $J_2$.

$$J_1 \begin{bmatrix} p_1 \\ p_2 \end{bmatrix} \Rightarrow m_1; J_2 \begin{bmatrix} p_1 \\ p_2 \end{bmatrix} \Rightarrow m_2$$

All the points within the function domain map into some shape (shown in the function space as an ellipse for example purposes only. Now find the point X because this results in the smallest value of $J_1$, $J_2$. This is the value of α, since $J_1 - \alpha = 0$ and $J_2 - \alpha = 0$. The inverse function of $J_i$ mapping from X (going from function space back to the function domain) yields the solution p. (The squares drawn in the function space are for various values of α, the corner of the square touching the curve of the mapped shape (here, the ellipse) is the value of α). [Note there is only one value of α—single value which is why the square is utilized.]

The solution point yields p and utilizing the RCA described in the aforementioned patent, the controller is determined. The model M(p) which is used to yield the improved performance also results.

Figure 3A:
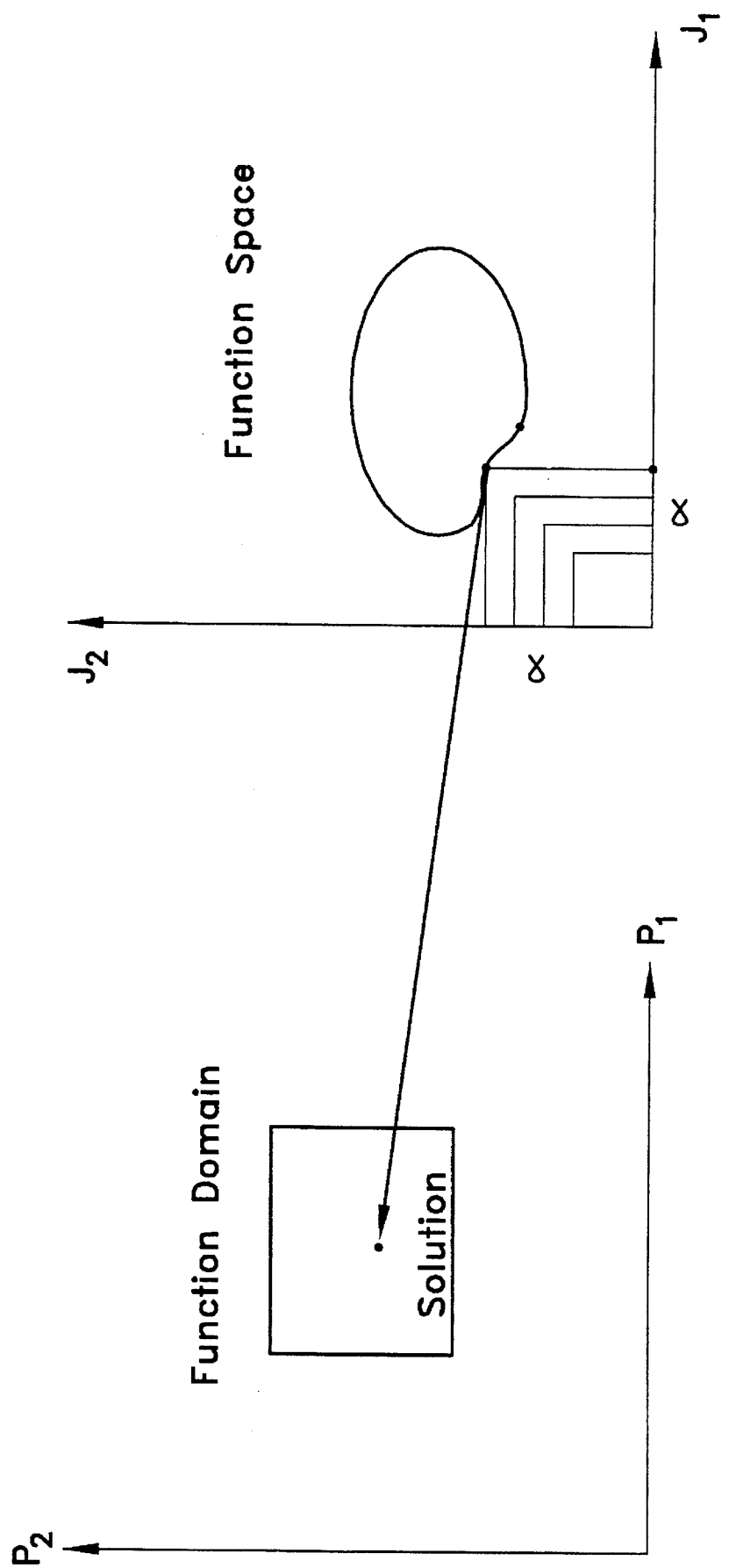
FIGS. 3A and 3B, show a graphical interpretation of FIG. 2 in which the function space maps into odd geometric shapes.
Figure 3B:
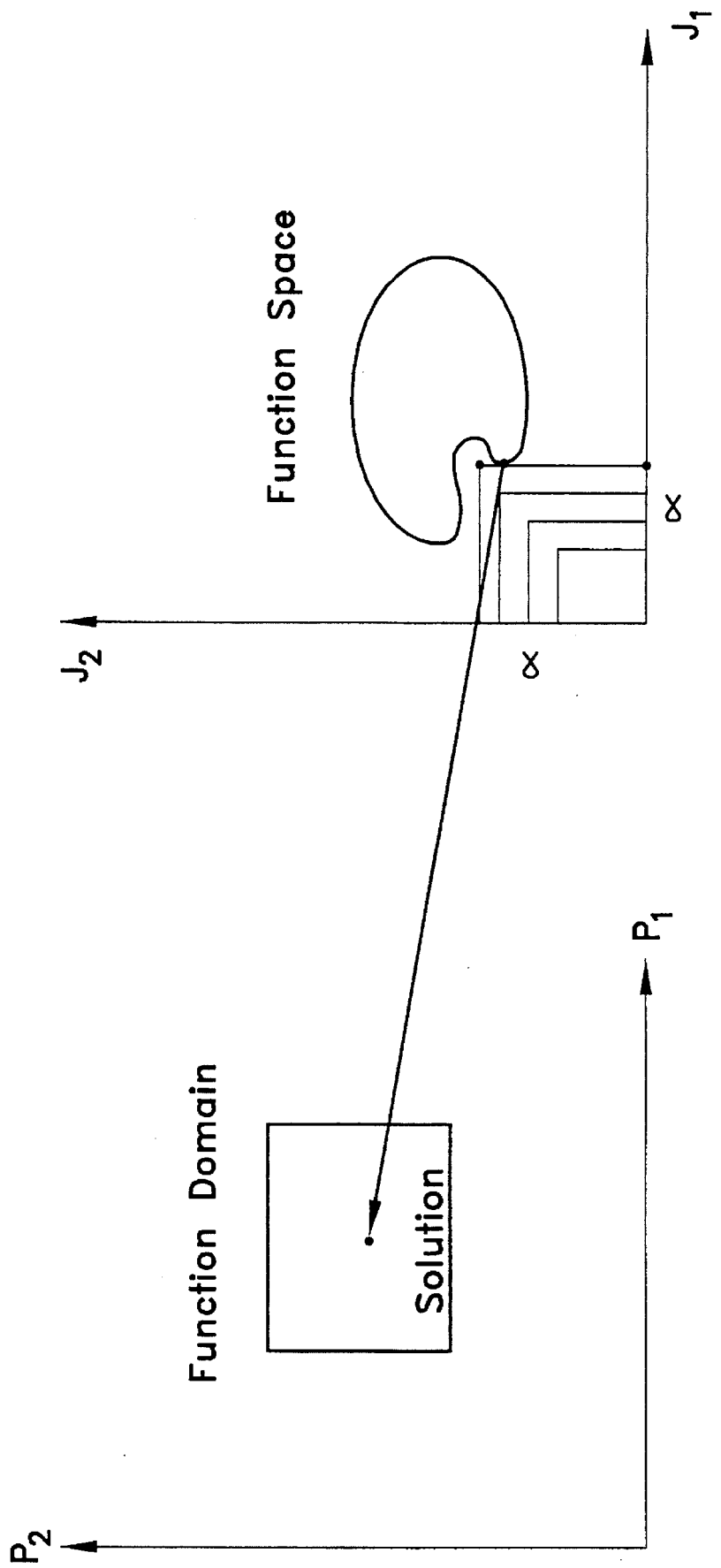

FIG. 3A and 3B, which together forms FIG. 3, shows a 2-dimensional graphical interpretation yielding differing function space curves.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. In a process control system having a controller for providing robust control to a process, the process further having at least one manipulated variable and at least one process variable, a method for providing the robust control of a process, comprising the steps of:

a) loading the controller with parameters which define an optimal controller, the parameters calculated off-line including the steps of:

i) defining a single min-max statement for a worst case model of the process to operate in conjunction with the controller having a best case;

ii) converting said single min-max statement to a corresponding minimization expression, the corresponding minimization expression being a canonical of the single min-max statement; and iii) solving the minimization problem yielding a resultant solution, the resultant solution being the parameters;

b) initializing the robust control to have predetermined constraints of the manipulated variables and the controlled variables;

c) obtaining present values of the manipulated variables and the process variables said process variables corresponding to measurement parameters of the process;

d) calculating new values of the process variables for a predetermined number of points in the future in order to have the values of the process variables within the predetermined range to obtain an optimal robustness of the resultant controller, the manipulated variables being within predetermined constraints, and the process variables falling within a predetermined range when controllable; otherwise, keeping process variable constraint violations to a minimum;

e) from a plurality of solutions, selecting a most robust solution; and f) controlling the process in accordance with the most robust solution.

* * * * *